Sept. 10, 1968  S. L. SPIRA ET AL  3,400,955

OVERLOAD LIMITING MECHANISM

Filed Dec. 18, 1964  2 Sheets-Sheet 1

SEYMOUR L. SPIRA
MITCHELL ARON
*INVENTORS*

BY

*Thomas W. Kennedy*
ATTORNEY

SEYMOUR L. SPIRA
MITCHELL ARON
INVENTORS

BY

*Thomas W. Kennedy*
ATTORNEY

United States Patent Office 3,400,955
Patented Sept. 10, 1968

3,400,955
OVERLOAD LIMITING MECHANISM
Seymour L. Spira, Ridgewood, and Mitchell Aron, Harrington Park, N.J., assignors to General Precision Inc., Little Falls, N.J., a corporation of Delaware
Filed Dec. 18, 1964, Ser. No. 419,383
5 Claims. (Cl. 287—20)

ABSTRACT OF THE DISCLOSURE

A vibration overload limiting mechanism for connecting a test specimen to a vibration table comprising an outer body connecting to said vibration table and an inner body connecting to said test specimen. Said outer body has a peripheral wall with side walls having inner surfaces forming a cavity with a longitudinal axis. Said inner body is disposed within said cavity with an axis parallel to said outer body axis. Said inner body has radially outer surfaces facing said inner surfaces and in frictional engagement therewith for minimizing slight relative displacement between said inner body and said outer body during vibration testing and for providing a preset-force level range for testing said specimen.

---

Figure 4:
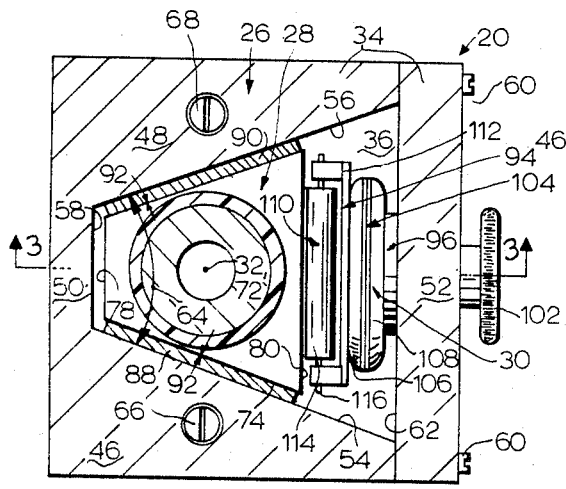

The present invention relates to an overload limiting mechanism, and particularly to a vibration overload limiting mechanism.

This invention is particularly useful for mounting delicate instruments subjected to vibratory forces from an exterior source, such as an instrument specimen mounted on a high-acceleration vibration test table.

Prior-art vibration overload connections, such as is described in U.S. Patent Nos. 2,856,999 and 2,775,137, have a hollow outer body, a coaxial inner body enclosed by said outer body, and a spring-actuated latch release means interconnecting said outer body to said inner body.

A problem with such prior-art vibration mounts is the sudden reduction in the amount of restraint force provided by the mount upon the occurrence of a vibration overload, which may lead to instrument damage.

Other problems with such prior-art vibration mounts, particularly for use in combination with a vibration test table, are the excessive power input required to provide high-frequency vibration testing and the distortions obtained at most frequencies in the measured acceleration-versus-time sine-wave curves, which are caused by the inherent low stiffness and low natural frequency of said prior-art vibration mounts.

In accordance with one embodiment of the present invention, the sudden reduction in the restraint force by the vibration mount is avoided and its inherent stiffness is increased by using confronting bearing surfaces on said outer body and said inner body in frictional engagement along a plane parallel to the direction or axis of applied vibrations or acceleration forces, instead of spring-actuated latch means.

Accordingly, it is one object of the invention to provide a vibration test table having overload release mounts for connecting a test specimen to said table, and for preventing conduction of excessive acceleration loads therethrough from the table to the test specimen.

It is another object of the invention to provide an overload limiting mechanism for mounting a delicate instrument subjected to excessive vibration or acceleration forces from an exterior source.

It is a further object of the invention to provide an overload limiting connection according to the aforementioned objects which has means for adjusting said overload level.

It is a still further object of the invention to provide an overload limiting connection according to the aforementioned objects, which can provide a continuous substantially-constant force level for a determined time interval after release.

To the fulfillment of these and other objects, the invention provides an overload connection comprising an outer body having a cavity with a longitudinal axis and having an axially-parallel radially-inner surface, and an inner body disposed within said cavity and having an axially-parallel radially-outer surfce facing said inner surface and in frictional engagement therewith.

Figure 7:
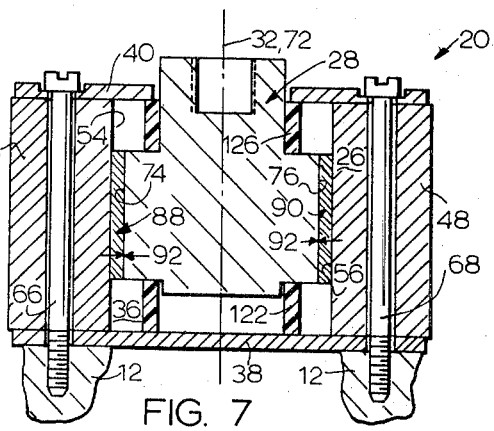
Figure 3:
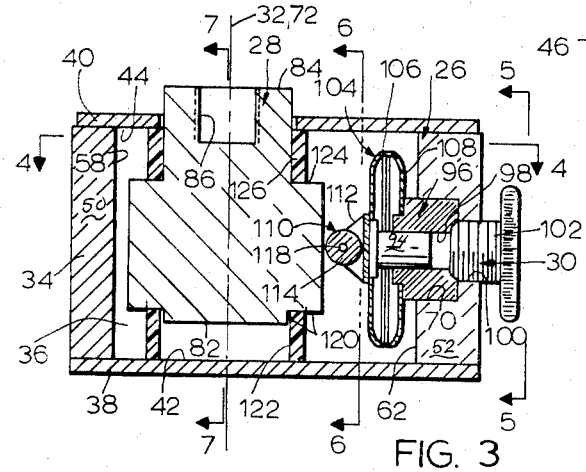
Figure 6:
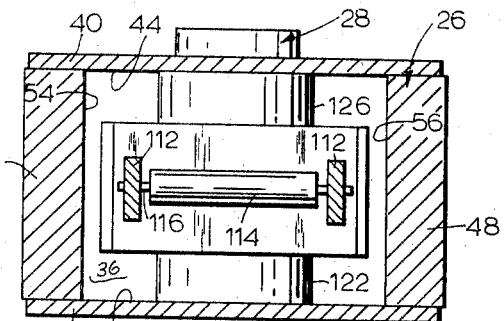
Figure 5:
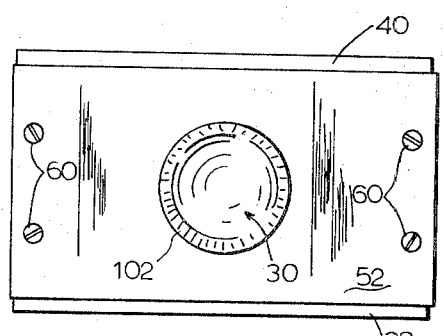
Figure 2:
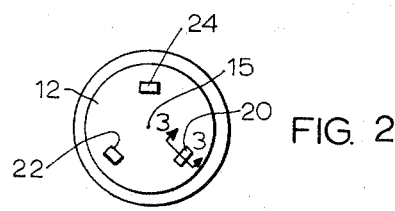
Figure 1:
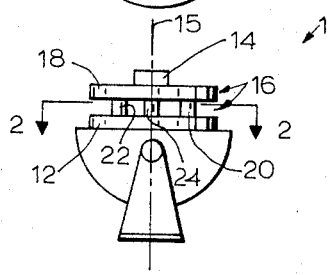
Figure 8:
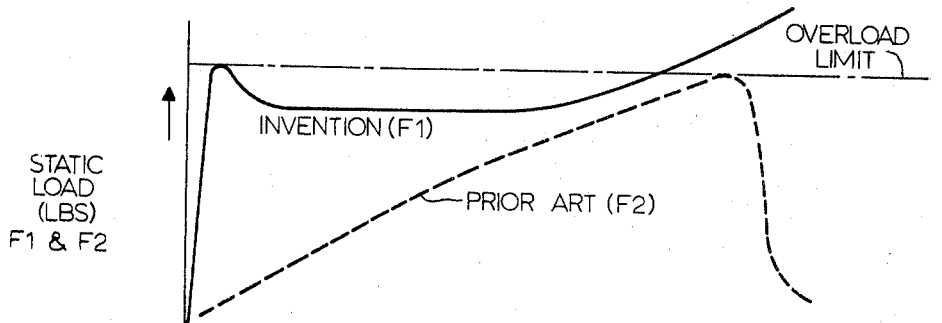
Figure 9:
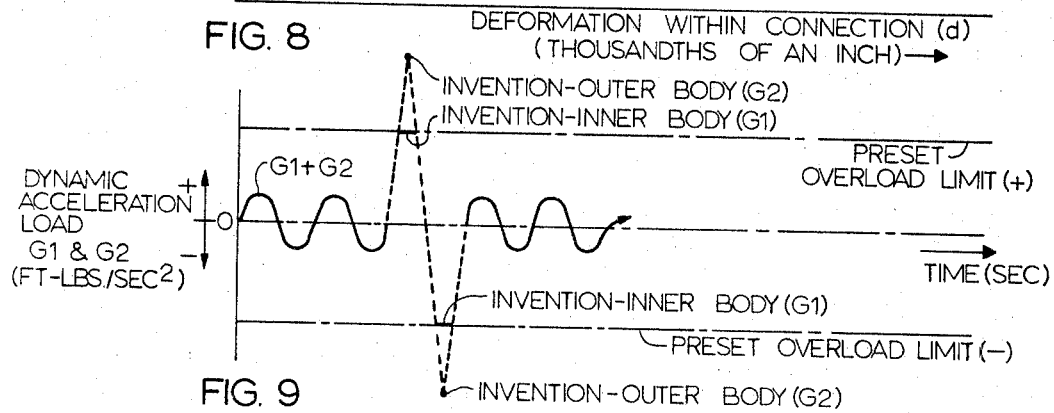
Figure 10:
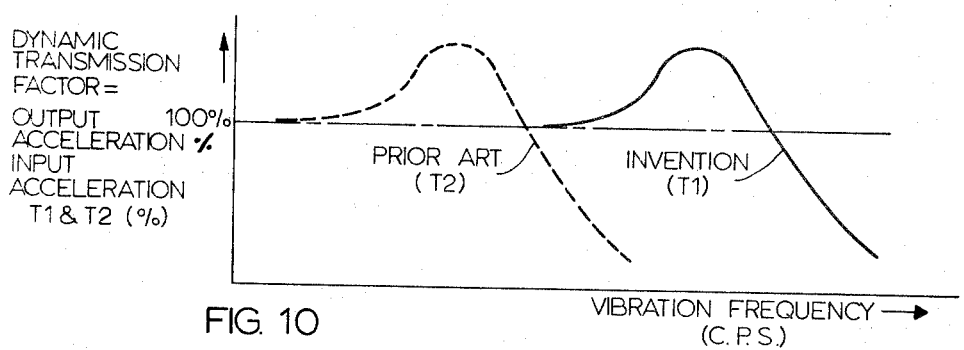

Further objects of the invention will become apparent upon reading the annexed detailed description in connection with the drawings wherein like parts are designated by like numerals throughout the several views, and wherein:

FIG. 1 is a schematic elevation view of a vibration test table embodying features of the present invention;
FIG. 2 is a sectional view taken along line 2—2 of FIG. 1;
FIG. 3 is a sectional view taken along line 3—3 of FIG. 2;
FIG. 4 is a sectional view taken along line 4—4 of FIG. 3;
FIG. 5 is a sectional view taken along line 5—5 of FIG. 3;
FIG. 6 is a sectional view taken along line 6—6 of FIG. 3;
FIG. 7 is a sectional view taken along line 7—7 of FIG. 3;
FIG. 8 is a curve of static load vs. deformation;
FIG. 9 is a curve of acceleration load vs. time; and
FIG. 10 is a curve of transmissibility vs. frequency.

Referring to FIG. 1, one embodiment of the present invention is a vibration testing system 10 which includes a shaker table 12 with an axis 15 and a test specimen 14 that is fixedly mounted thereon along axis 15 by an overload limiting fixture 16. Fixture 16 includes a rigid plate 18 on top of which specimen 14 is fixedly mounted, and includes three overload limiting connections 20, 22, 24 of identical construction, which respectively connect to plate 18 disposed above said connections and to table 12 disposed below said connections. Connections 20, 22, 24 are preferably equi-spaced about an equi-distant from axis 15.

Overload connection 20, which is shown in FIGS. 3–7, inclusive, will be described hereafter in detail. Connection 20 comprises an outer body 26 fixedly connected to table 12, an inner body 28, which is disposed within outer body 26 and which is fixedly connected to specimen 14, and an adjustable pressure assembly 30 which is disposed transversely between outer body 26 and inner body 28 for urging inner body 28 into frictional engagement with outer body 26.

Outer body 26 (FIG. 4) has an axis 32, which is the axis of applied accelerations; and has a peripheral wall 34 defining a cavity 36 within which an inner body 28 is disposed. Outer body 26 also has a pair of end plates 38, 40 (FIG. 3) for closing cavity 36 at its ends, with respective inner faces 42, 44 substantially perpendicular to axis 32. Axis 32 is also preferably parallel to table axis 15.

Peripheral wall 34 (FIG. 4), which has a rectangular cross-section, includes four peripherally-spaced side walls 46, 48, 50, 52. Walls 46, 48 have respective oppositely-facing inner surfaces 54, 56 on their inner sides, which are substantially equi-distant from and parallel to axis 32 for frictional engagement with inner body 28.

Wall 50, which is integrally connected to the adjacent ends of walls 46, 48, has an inner surface 58; and wall 52, which is removably connected to the opposite ends of said walls 46, 48 by bolts 60, or the like, has an inner surface 62 which is substantially parallel to surface 58.

Surfaces 54, 56 are inclined at equal acute angles in cross-section relative to wall 52 so that cavity 36 has a symmetrical profile in cross-section and so that a V-shaped groove with a groove angle 64 is formed therebetween (FIG. 4). In this way, inner body 28 is wedged between surfaces 54, 56 within groove angle 64. Groove angle 64 is small enough to make coplanar outer body axis 32 and the two friction forces at surfaces 54, 56, in order to avoid tilting of inner body 28 under load; and groove angle 64 is also large enough to minimize the ratio of the applied force from pressure assembly 30 relative to the normal forces at said friction surfaces 54, 56. Surfaces 54, 56, and 58, 62 are so arranged that a plane through axis 32, which is normal to parallel surfaces 58, 62 will be midway between surfaces 54, 56 and will bisect their groove angle 64.

Walls 46, 48 are fixedly connected to table 12 by respective bolts 66, 68, or the like (FIG. 7). Bolts 66, 68 are disposed parallel to and equi-distant from axes 15 and 32 for equalizing axial loads in said bolts. Bolts 66, 68 are also disposed in a plane including axis 32, which plane is substantially at right angles to a plane bisecting groove angle 64. Wall 52 has a cylindrical bore 70 (FIG. 3), which is disposed midway between surfaces 54, 56, and in which pressure assembly 30 is journaled at one end thereof for providing a fixed support for cantilevering radial member 30.

Inner body 28 has an axis 72, which is substantially parallel to axis 32 and which is preferably also coincident therewith. Inner body 28, which has a trapezoidal profile similar in cross-section to that of cavity 36, has four outer surfaces 74, 76, 78, 80 (FIG. 4), that are respectively opposite to and substantially parallel to inner surfaces 54, 56, 58, 62, thereby providing frictional engagement of surfaces 54, 74, and 56, 76, and providing clearances respectively between surfaces 58, 78 and 62, 80.

Inner body 28 also has a pair of axially-spaced end faces 82, 84 (FIG. 3), which face in an axially outward direction. End face 84 has a threaded bore 86 (FIG. 3) recessed therein, which is coaxial with inner body 28 along axis 72 for coupling test specimen 14 (not shown in FIG. 3), and for transmitting an axial force from specimen 14 along axis 72.

Friction surfaces 74, 76 respectively have substantially-identical friction linings 88, 90 which are fixedly joined thereto, such as by an adhesive layer 92, or the like. The material of linings 88, 90 in combination with inner surfaces 54, 56 preferably has a low static coefficient of friction in order to provide repeatability, which is the capacity of the material to maintain a substantially constant coefficient of friction under repeated loading, variations in loading, elapse of time and natural environmental variations. With this arrangement of outer body 26 and inner body 28, inner body 28 can receive the force from pressure assembly 30 in a radial direction bisecting groove angle 64. With this construction, the friction-force level of connection 20 is substantially equal to the product of the applied force by pressure assembly 30 and the coefficient of friction of linings 88, 90 divided by the sine of one-half groove angle 64.

Pressure assembly 30 has a pair of radially spaced portions 94, 96 (FIG. 3), with radially outer portion 96 being journaled in bore 70 for its support by wall 52. Pressure assembly 30, which is disposed midway between surface 54, 56, is also disposed substantially at right angles to surface 62 to thereby substantially equalize the frictional forces at surfaces 54, 56. Outer portion 96 has a cylindrical recess 98 in which an adjacent end of inner portion 94 is snugly received for support of inner portion 94 by outer portion 96. Bore 70 has a threaded portion 100 receiving an adjusting screw 102, which is movable relative thereto for urging pressure assembly 30 in a radially inward direction against surface 80.

Pressure assembly 30 also supports spring means 104, which is disposed between portions 94, 96. Spring 104 is comprised of two identical belleville-spring plates 106, 108, which are mounted concentrically on respective portions 94, 96 in a conventional manner. Plates 106, 108 are disposed with their concave sides in confronting relation and respective perimeters in contact. Plate 106 is journaled on and bears against a stepped diametrical part of portion 94; plate 108 is journaled on and bears against an oppositely-facing, stepped diametrical part of portion 96, thereby urging portions 94, 96 apart. In this way, pressure assembly 30 is provided with an adjustable spring rate for adjusting the frictional-force level of overload connection 20.

Portion 94 has a bearing means 110 (FIGS. 3, 4) disposed at its radially inner end. Bearing means 110 comprises a U-shaped yoke 112, which supports a roller 114 for rotation relative thereto. Yoke 112 supports a shaft 116 disposed between its ends. Shaft 116 has an axis 118, which is disposed within a plane substantially at right angles to axis 32 and which is disposed parallel to surface 80. Bearing means 110 minimizes the frictional restraint between surface 80 and pressure assembly 30. In this way, axes 32, 72 remain substantially coincident during movement of inner body 28 relative to outer body 26 thereby avoiding tilting or seizing of inner body 28 during said movement.

In operation, table 12 normally exerts a total vibratory force along axis 15 causing substantially equal respective vibratory forces in identical overload connections 20, 22, 24. In connection 20, the respective force is transferred from table 12 to outer body 26 in substantially equal amounts through bolts 66, 68 with the resultant of said bolt forces acting along axis 32. Such force in outer body 26 is transferred to inner body 28 through two substantially equal friction forces acting along respective linings 88, 90. The resultant of said friction forces is substantially directed along axis 72, which is preferably coincident with axis 32. Such force in connection 20 passes along axis 72 from inner body 28 to plate 18 and into specimen 14.

FIGURE 8 is a graph of static load and instantaneous vibratory load vs. internal deformation for comparing the curve (F1) of one sample of embodiment 20 with a typical curve (F2) of a prior-art connection, such as the one described in the aforementioned U.S. Patent No. 2,856,999. FIG. 8 illustrates the relative steepness of curve F1 prior to reaching a desired overload limit, which indicates the relatively large internal stiffness and elasticity modulus of connection 20. Such stiffness minimizes a slight displacement of inner body 28 relative to outer body 26, and between its test specimen 14 and shaker table 12, during vibration; and such stiffness also minimizes a slight difference in amplitude of the respective sine-wave curves of inner body 28 relative to that of outer body 26.

FIG. 9 is a graph of dynamic acceleration load vs. time for comparing the actual-test sine curve (G1) of inner body 28 with the corresponding sine curve (G2) of outer body 26 in one sample of embodiment 20. FIG. 9 illustrates the capability of connection 20 to transmit vibratory or acceleration forces within the preset-overload-limit range without having a substantial difference in the amplitude of their respective curves (G1 and G2). FIG. 9 also illustrates the capability of connection 20 to absorb portions of said forces outside of or beyond said preset-overload-limit range thereby avoiding damage to its specimen 14.

FIG. 10 is a graph of transmission factor and transmissibility vs. vibration frequency for comparing the test curve (T1) of one sample of embodiment 20 with the corresponding curve (T2) of a typical prior-art connection, such as the one described in the aforementioned U.S. Patent No. 2,856,999. The transmission factor equals the output acceleration divided by the input acceleration. FIG. 10 illustrates the greater capability of embodiment 20 to operate at relatively higher frequency loads than said prior-art connection because of its relatively greater stiffness as illustrated in FIG. 8.

Inner body 28 has a cylindrical recess 120 in lower face 82 receiving a resilient ring 122 composed of elastomeric material, or the like; and inner body 28 also has a corresponding cylindrical recess 124 in upper face 84 receiving a ring 126 for isolating inner body 28 from outer body 26 at extreme limits of displacement therebetween. In FIG. 8, curve F1 remains at a substantially-constant load level with increasing deformation after passing its overload limit. Rings 122, 126 act as isolators and dampers on inner body 28 so that curve F1 rises gradually at a relatively large deformation of said connection 20.

In summary, an overload limit connection is provided with a high internal stiffness suitable for high frequency vibration loading, which can interconnect a test specimen to a vibration table and can prevent transmission of G-spike, acceleration-force overloads thereby avoiding specimen damage. Such a connection 20 is also useful as a vibration mount for a sensitive instrument, such as a mount for a gyroscope, an accelerometer or a gyro platform.

While the present invention has been described in a preferred embodiment, it will be obvious to those skilled in the art that various modifications can be made therein within the scope of the invention. For example, bearing means 110 can be constructed of a plain bearing plate coated with suitable lubricant instead of the illustrated roller-type bearing with a yoke 112 and a roller 114. It is intended that the appended claims cover all such modifications.

What is claimed is:

1. An overload connection for connecting a test specimen to a vibration table comprising:

an outer body having a peripheral wall with side walls having radially inner surfaces forming a cavity with a longitudinal axis, with said axis also forming an axis along which vibration inducing forces would be directed;

an inner body disposed within said cavity with an axis parallel to said outer body axis having radially outer surfaces facing said inner surfaces with at least a pair of confronting surfaces in frictional engagement along an inclined plane parallel to said axes for minimizing slight relative displacements between inner body and outer body during vibration testing and for providing a preset-overload-limit range for testing said specimen; and, an adjustable pressure assembly disposed between said outer surfaces and said adjacent inner surfaces on one side of said inner body for adjusting the amount of frictional force between said outer body and said inner body, said adjustable pressure assembly having a radially inner end with a roller bearing surface engaging the adjacent outer surface of said inner body for minimizing friction between said radial member and said inner body.

2. A connection as claimed in claim 1, in which said adjustable pressure assembly has two radially spaced portions with a spring means clamped therebetween urging said portions radially apart and for providing a spring rate type of adjustment.

3. A connection as claimed in claim 1, in which a pair of said side wall inner surfaces are peripherally-spaced, axially-parallel and oppositely-facing thereby forming a V-shaped groove disposed opposite said adjustable pressure assembly for wedging said inner body between said inner surfaces of said groove.

4. A connection as claimed in claim 3, in which said adjustable pressure assembly is disposed midway between said groove walls substantially at right angles to said outer body axis for equalizing the friction forces adjacent to said groove walls.

5. A connection as claimed in claim 4, in which said overload connection has a preset overload force applied thereto.

References Cited

UNITED STATES PATENTS

| | | | |
|---|---|---|---|
| 1,400,491 | 12/1921 | Mechling | 24—136.3 |
| 1,654,597 | 1/1928 | O'Toole | 105—81 |
| 1,777,578 | 10/1930 | Roberts | 105—81 |
| 2,856,999 | 10/1958 | Wilhelm | 287—20 |

FOREIGN PATENTS

| | | |
|---|---|---|
| 1,028,717 | 2/1953 | France. |
| 204,070 | 6/1959 | Austria. |

CARL W. TOMLIN, *Primary Examiner.*

ANDREW KUNDRAT, *Assistant Examiner.*